United States Patent [19]

Moore

[11] Patent Number: 5,031,168

[45] Date of Patent: Jul. 9, 1991

[54] APPARATUS AND METHOD FOR INCREASING STORAGE CAPACITY OF RECORDING MEDIA

[75] Inventor: George S. Moore, Colorado Springs, Colo.

[73] Assignee: Information Storage, Inc., Colorado Springs, Colo.

[21] Appl. No.: 521,187

[22] Filed: May 9, 1990

Related U.S. Application Data

[63] Continuation of Ser. No. 405,096, Sep. 8, 1989, abandoned, which is a continuation of Ser. No. 262,226, Oct. 21, 1988, abandoned, which is a continuation of Ser. No. 826,190, Feb. 5, 1986, abandoned.

[51] Int. Cl.$^5$ .............................................. H04N 5/92
[52] U.S. Cl. ...................................... 369/59; 360/40; 360/48
[58] Field of Search .......................................... 369/59

[56] References Cited

U.S. PATENT DOCUMENTS

| | | | |
|---|---|---|---|
| 3,564,558 | 2/1971 | Tolman et al. | 360/58 |
| 4,539,691 | 9/1985 | Ogawa et al. | 369/59 |
| 4,543,617 | 9/1985 | Kobayashi | 369/111 |
| 4,550,347 | 10/1985 | Nakamura | 369/50 |
| 4,663,676 | 5/1987 | Voegeli | 360/41 |

OTHER PUBLICATIONS

"Mathematical Snapshots", by M. Steinhaus, Oxford University Press, ©1950, pp. 202, 203.
"Optical Recording Format", by N. K. Arter et al., IBM TDB, vol. 26, #78, 12/83.

Primary Examiner—Vincent P. Canney
Attorney, Agent, or Firm—Merchant, Gould, Smith, Edell, Welter & Schmidt, P.A.

[57] ABSTRACT

An improved method of configuring digital information in a recording storage media so as to significantly increase the information storage capacity of the media, and the media containing such configured digital information are disclosed. Information containing markers are arranged and configured along tracks in the media in a manner such that markers of adjacent tracks are offset relative to one another. Inter-track spacings of arcuately shaped tracks on a storage media are progressively reduced as a function of the radial spacing of the tracks from their center of curvature, further increasing the marker packing density. Return to zero pulsed modulation schemes are employed to maximize the amount of information recorded in a given number of marker locations. Drive means for reading digital information configured on storage media according to the principles of this invention are provided.

57 Claims, 5 Drawing Sheets

APPARATUS AND METHOD FOR INCREASING STORAGE CAPACITY OF RECORDING MEDIA

This is a continuation of application Ser. No. 405,096, filed Sept. 8, 1989, which was abandoned upon the filing hereof, which is a continuation of application Ser. No. 262,226, filed on Oct. 21, 1988, abandoned, which is a continuation of Ser. No. 826,190 filed Feb. 5, 1986, also abandoned.

CROSS-REFERENCE TO RELATED APPLICATION

The following co-pending U.S. patent application is herein incorporated by reference and forms a part hereof as if fully set forth herein: Ram Head Positioning and Tracking System; Ser. No. 06/739,514; owned by the common assignee of this application filed on May 31, 1985.

FIELD OF THE INVENTION

This invention relates generally to information storage media and more particularly to an improved method and apparatus for increasing the information storage capacity of such optical and magnetic information storage media.

DESCRIPTION OF THE ART

1. General

Nothing more typifies today's technological advances than the development of computers and computer related technology over the last decade. The industry continues to expand and diversify at an astounding rate, and has been primarily responsible for providing the means for challenging and pushing the frontiers and limits of knowledge in both scientific and nonscientific disciplines. Within the computer industry itself, there has been remarkable development of both computer hardware and software for handling applications of virtually any size and purpose. Besides the mainframe computers, the industry has been directly responsible for development of the related semiconductor, memory storage and peripheral component industries as well as countless other support technologies upon which the computer industry relies. For example, the semiconductor technology has produced large scale integrated circuits, giving higher circuit packaging densities and faster operating logic elements which have led to significant increases in memory densities through the use of semiconductor memory circuits. In the magnetic memory area, storage density increases in hard and flexible disk systems have been achieved by improvements in magnetic recording media and in the reading and writing heads associated therewith.

Such technological advances in the semiconductor and the magnetic memory arts, however, have not always translated back to provide economical systems for use in applications requiring economical, accurate and secure storage of information over extended periods of time. For example, the cost per bit of information stored by means of semiconductor or magnetic storage media, coupled with the encoding costs for storing the information cannot always be justified by smaller users or by those in industries requiring storage on a routine basis of large volumes of traditional business records. These factors, along with the fact that most semiconductor and magnetic memories do not routinely provide the security required for accurately maintaining stored information over long periods of time, have led to the development of optical information recording media. As will become apparent to those skilled in the art from a more detailed description of the invention, while the principles of this invention are most applicable to optical information recording techniques, as known today, with minor modifications, this invention's concepts can also readily be applied to the magnetic recording art.

2. Optical Recording

The optical recording technology, often referred to as the digital laser recording has been developed in recent years for providing high density binary and digital analog data storage. The data recorded by such optical systems is readily usable with both standard data processing equipment and facsimile document scanning and printing apparatus. The optical recording technology offers the capability for real time optical recording of image data in a highly compressed format and rapid opto-electronic access to recorded image data, thereby providing the basic framework for computer based document storage and retrieval and an overall record management system. Typical applications for optical data storage media include: on-line storage of active records; software and databases for complimenting hard disk storage; on-line storage of business and professional documents (i.e. electronic file cabinets); archival storage of inactive records and documents; capture of audit trail or operating history data; publication of software, databases or text records; compression of floppy disk libraries; storage of CAD/CAE design libraries; backup of hard disks; and many others.

While a number of areas have been explored relating to optical data recording principles, the technology is still in the early stages of development. One optical data recording system typically in use today depends upon data writing and reading apparatus that uses a highly focused laser beam for storing binary digital information on an optically sensitive or responsive storage media, and for reading back such stored information by means of a highly focused laser beam that scans across the recording medium. Typical of a recording medium in use today is an optical storage disk member usually configured either of glass or molded plastic material and having a film layer thereon or formed therein suitable for recording optical signals received from a laser beam writing head. The surface configuration of such optical recording disks can be smooth or can contain grooves formed therein (often referred to as pre-grooved disks). Information is typically recorded or stored on the disks either in concentric, radially spaced data rings or tracks or in spiral tracks formed about the center of the disk.

While significant efforts have been directed toward developing the physical properties of optical recording disks and toward the optical recording and reading apparatus, little has been done to increase the storage capacity of any particular disk design. Further, design efforts related to optical recording disks have in large measure, to date, used formatting and recording techniques virtually identical in principle to those used in the analogous magnetic recording art, and have not focused on the unique properties peculiar to optical recording, that allow for significant capacity increases over those methods and apparatus used in the magnetic recording art.

The present invention addresses the above design shortcomings heretofore practiced in the art by providing a simple yet highly effective, reliable and accurate technique for significantly increasing the storage capacity of existing optical information storage media. By applying the principles of this invention, the storage density of existing optical storage devices can be nearly doubled, without sacrifice in storage accuracy, and generally without requiring any mechanical, optical or media changes to be made. As applied to optical storage media of the disk type, the principles of the present invention can be applied to disks having either smooth, pre-grooved or pre-written surfaces, and can be applied to concentric as well as to spiral data recording track configurations. These and other features of the invention will become apparent to those skilled in the art upon a more detailed description herein.

SUMMARY OF THE INVENTION

As will become apparent to those skilled in the art, the principles of the invention described herein are most applicable to the optical information storage art as known today. For this reason, the preferred embodiment of the invention will be described with reference to an optical recording application and with respect to a particular type of optical recording media having a particular information recording format. It will be understood that the principles of this invention are not to be limited to the optical recording art. For example, concepts embodied by this invention can apply equally well to the magnetic recording art, through minor modifications to those techniques disclosed herein with reference to the optical art, as will be readily apparent to those skilled in the art. Special techniques for recording the markers, as herein defined, as well as techniques to permanently record the tracking bits will be apparent to those skilled in the art. Further, as will be apparent to those skilled in the art, the more circular in shape the marker, the greater the increase in storage capacity that can be achieved. While the benefits obtained by the use of this invention with optical media will be substantially greater than those obtained using magnetic media and recording techniques as known today, applicability of the invention to the magnetic recording art should not be overlooked.

The invention incorporates an improved method of configuring digital information on a recording storage media of the type having a recording surface area so as to significantly increase the amount of information that can be stored on such surface. The invention also provides for the digital recording storage media thus configured and the drive apparatus used for reading information from such a configured digital recording storage media. As mentioned above, the principles of this invention apply to information recording storage media of varied types, for example, those types of media which can be magnetically or optically written and read, as well as to those which employ combined opto-magnetic techniques. Such recording storage media is suitable for recording discrete markers of information in response to appropriate energy bursts from a writing device. By way of example only, energy means for creating the markers could be in the form of a laser pulse, an electromagnetic energy burst, an electron beam, or the like, as dictated primarily by the nature of the information storage media with which the invention is used. Alternatively, the information could be replicated onto the recording media as for example in an optical read-only-memory (0-ROM) system. Each marker represents and-/or contains one or more bits or levels of digital information. Most typically, (when binary logic is used) the presence or absence of a marker at a designated marker location will logically signify a binary "1" or "0". However, as will be described in more detail hereinafter, the invention is not limited to digital recording techniques employing binary logic. The invention also applies to digital recording techniques employing "m-ary" logic wherein each marker may represent "m" unique levels of digital information, such as might be the case with an opto-magnetic technique wherein the media at a marker location may be polarized to "m" different polarization angles which can be uniquely identifiably detected by the reading head.

The markers may be of varied shapes and configurations, each characterized by an effective domain or diameter parameter as measured relative to the surface area of the recording storage media in which they are formed. The principles of this invention are most effectively utilized with markers having a generally circular configuration; however, the principles of this invention also apply, but with reduced efficiency, to markers having, for example, an elliptical or other irregular shape. The markers are formed in the storage media, on or along paths followed by a reading head, which are generally referred to as tracks. The particular path followed by a track along the recording surface of the storage media will be depend upon the geometrical configuration of the media support structure and upon the properties of the media drive apparatus. The principles to all types of storage media configurations wherein the media is configured so as to define a recording surface. For example, the recording surface could be generally planar as would be the case for recording storage disk or plate configurations, or could be non-planar, as might be the case for a recording storage drum configuration. As will be appreciated by those skilled in the art, for a recording storage plate configuration, the tracks along which the markers are positioned would most likely be arranged in rows and/or columns. For the situation wherein a recording storage disk is employed, the marker tracks could be configured in the nature of concentric rings formed about the center of the disk, or could represent one single track spiraling about the center of the disk. Similarly, a recording storage media configured in the shape of a drum could employ either a single continuous curvilinear track or a plurality of coaxially aligned tracks longitudinally spaced along the recording surface area of the drum. As will be appreciated by those skilled in the art, the storage media surface itself can be smooth or could be pregrooved or prestamped, wherein the track would typically follow the grooves.

One aspect of the invention comprises a method of writing information into a digital recording storage media of the type having a recording surface area and being suitable for recording discrete markers of information in response to energy bursts from a writing device. Such markers are characterized by an effective diameter parameter as measured relative to the surface area. The method according to this aspect of the invention comprises:

(a) forming a first track segment of digital information in the storage media comprising a plurality of said markers aligned and spaced along a first track; and (b) forming a second track segment of digital information in said storage media comprising a plurality of said markers aligned and spaced along a second track, wherein the second track segment is disposed generally parallel to and adjacent the first track segment and is spaced therefrom by a distance less than or equal to about twice the largest effective diameter of the markers, and wherein the markers of the first and the second track segments are offset from one another.

While the invention finds applicability for use with the above-defined track spacing, the offset marker configuration enables the tracks of prior art data storage media to be placed closer to one another than heretofore possible. The defined first and second track segments can readily be positioned next to each other a separation therebetween of less than or equal to one and one-half times the largest effective diameter of the markers. Such conditions can be achieved even when the effective diameter parameter of the markers is less than or equal to about 1.0 micrometers. The markers of adjacent tracks are offset relative to one another similar in nature to that configuration employed by the hexagonal close packing theorem. While it is preferable that the markers from adjacent tracks do not engage or overlap with one another, such engagement or overlapping may be permissible if the inter-track interference parameters associated therewith enable the digital information reading head to still distinguish between the respective digital information represented by the markers of the respective adjacent tracks.

The principles of the invention can be extended to the formation of a plurality of such generally parallel data recording tracks each having adjacent segments having marker locations respectively offset from those marker locations of the adjacent tracks. Such offset marker geometry configuration finds particular applicability to data storage media of the disk type wherein the tracks are either concentrically or spirally (in the case of single track) arranged around the center of the disk recording surface. In such disk configurations, the marker packing density on the disk recording surface can be further increased by decreasing the inter-track spacing as a function of increase in radial distance of the tracks from the center of the disk. According to a preferred application of the invention, the inter-track spacing is configured to monotonically decrease as a function of the increase in radial distance from the center of the disk. While the radial position of any track measured with respect to the central axis of the disk may be determined by any smoothly varying function, according to one aspect of the invention, such function represents a polynomial function, and more preferably a second order polynomial function. As will be apparent to those skilled in the art, the offset marker geometry enables an initial reduction of inter-track spacing, while the non-uniform track spacing applicable to a disk-shaped recording media enables still further marker packing density at the outer track areas of the disk.

Yet additional information storage capacity of a recording storage media can be achieved by properly selecting the modulation scheme used in formatting the markers on the media recording surface. For example, a preferable modulation scheme wherein each marker position along a track represents a full bit of information is the return-to-zero modulation scheme. As compared to those modulation schemes wherein a full bit of information requires two separate cells or markers, the amount of information recordable on a given track or area of an information recording media, is immediately doubled.

Therefore, according to one aspect of the invention there is defined a method of configuring information stored in an optically readable information storage media of a recording disk of the type wherein the information is stored by means of markers characterized by generally circular shape and aligned along one or more tracks having generally parallel adjacent track segments disposed about the center of the disk, comprising:

(a) defining a first track of optically readable information on said disk, said first track being characterized by a plurality of spaced markers formed generally along a circle having its center at the axis of the disk; and (b) defining a second track of optically readable information on said disk, said second track being characterized by a plurality of spaced markers formed generally along a circle lying concentric with that of said first track, wherein said markers of said second track are angularly offset with respect to those of said first track.

According to another aspect of the invention there is provided a method of configuring information stored in an optically readable information storage media of a recording disk of the type wherein the information is stored by means of markers characterized by generally circular shape and aligned along one or more tracks having generally parallel adjacent track segments disposed about the center of the disk, comprising:

(a) defining a first track of optically readable information on said disk, said first track being characterized by a plurality of spaced markers formed generally along a circle having its center at the axis of the disk; and (b) defining a second track of optically readable information on said disk, said second track being characterized by a plurality of spaced markers formed generally along a circle lying concentric with that of said first track, wherein said markers of said second track are angularly offset with respect to those of said first markers of said second track are angularly offset with respect to those of said first track.

According to a further aspect of this invention there is provided a digital recording storage apparatus having the track and marker configurations oriented on the recording surface area of the recording storage media as described above, wherein markers of adjacent track segments are offset from one another. The invention further provides for such digital recording storage apparatus of the disk type, wherein the markers of adjacent tracks are offset from one another, and wherein the radial spacing between adjacent tracks smoothly decreases monotonically as a function of the increase in radial distance of the track from the center of the disk. The invention also provides for digital recording storage apparatus as described above wherein the information recorded by way of markers on the tracks of the information storage media is modulated according to a return-to-zero modulation scheme.

According to a further aspect of the invention there is provided an information storage apparatus, comprising:

(a) an information storage media of a type suitable for selectively accepting digital information in the form of markers;

(b) means for supporting said information storage media so as to define a recording surface area of said media;

(c) said media recording surface having a plurality of generally parallel formatted tracks defined thereon, each of the tracks being characterized by a plurality of information storage locations aligned and spaced therealong, with each such information storage location being suitable for receiving a marker characterized by an area having a width dimension as measured relative to the recording surface area;

(d) adjacent ones of said tracks being spaced from one another by a distance less than or equal to twice said marker width dimension; and (e) wherein information storage locations of adjacent tracks are configured in interdigitated manner such that markers of adjacent tracks are offset relative to one another.

According to a further aspect of the invention, there is provided a drive apparatus for reading digital information from a recording surface of a digital recording storage media having information storage tracks and track segments configured thereon according to the above-described geometries and configurations. Such drive apparatus may assume varied configurations, depending upon the nature and configuration of the data storage media with which said drive apparatus is to be used. According to one aspect of the invention, the drive apparatus would include a read head suitable for detecting and responding to markers recorded on the recording storage media, means for positioning the head along the media surface to align said head with selected track locations, and means for effecting relative movement between the head and the media such that said head operatively reads digital information of said markers positioned along the selected track locations. When configured for use with a data recording media of disk configuration, and when the tracks of such disk are configured according to the principles of this invention to have progressively decreasing inter-track spacing which varies as a function of increased radial positioning of the track from the center of the disk, the means for positioning the head along the media surface would be responsive to the same function used to determine the progressive decrease in inter-track spacing.

While the invention will be described with reference to an optical recording disk structure, it will be readily understood by those skilled in the art that the invention is not limited to either the structure, the type of media described, the particular type of modulation used or the particular formatting technique described. Such description is intended to merely illustrate one specific embodiment to which the principles of this invention apply. Numerous other embodiments and variations and applications of the principles of the invention will become apparent to those skilled in the art, in light of the following description of preferred embodiments of this invention.

BRIEF DESCRIPTION OF THE DRAWING

Referring to the Drawing, wherein like numerals represent like parts throughout the several views:

FIG. 6 is an enlarged diagrammatic comparative illustration of the type shown in FIG. 5, illustrating information bit storage positions as they would appear at track locations at various distances from the center of the disk, when the offset geometry alignment principles of this invention are applied;

DETAILED DESCRIPTION OF THE INVENTION

Figure 1:
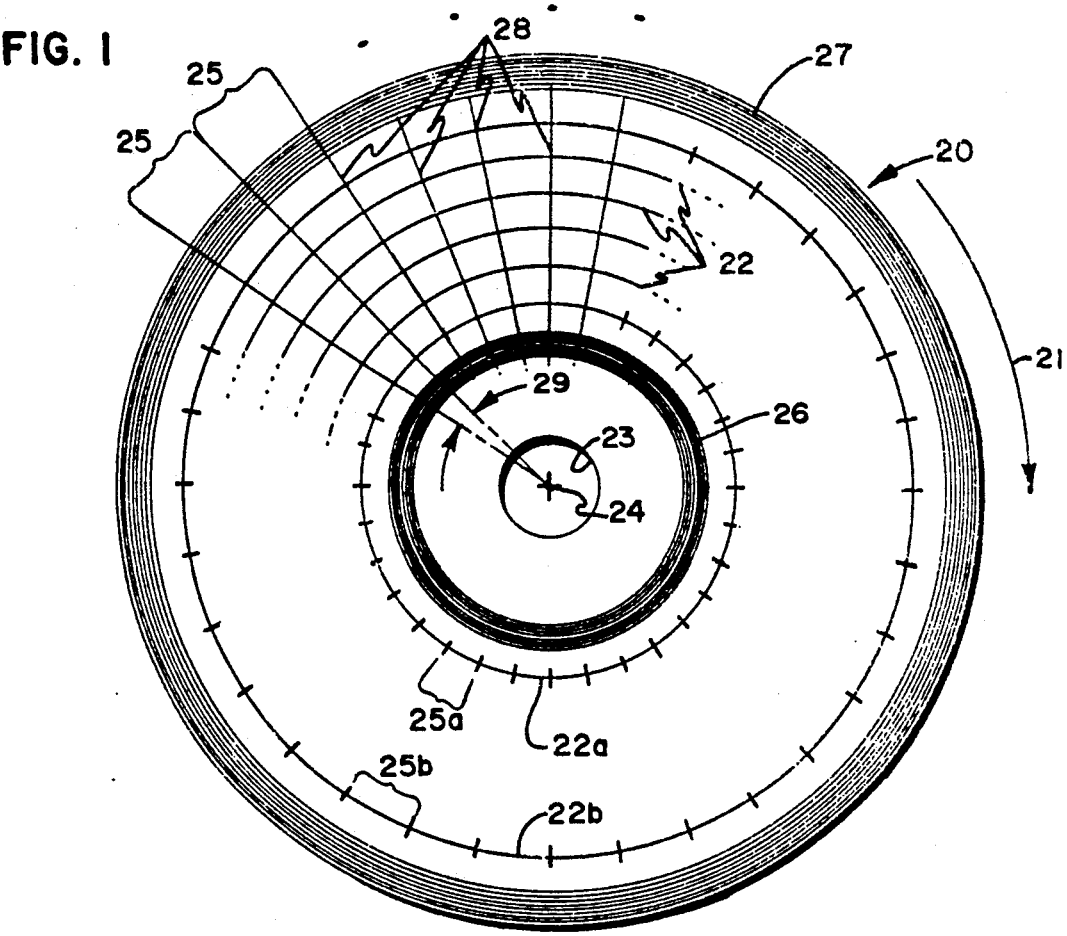
FIG. 1 is a diagrammatic plan view of an information storage disk illustrating an architectural layout of representative information storage tracks, sector definitions and the inner and outer storage limits of the disk recording media.

As discussed in the Summary portion of this specification, the following description of the invention as applied to the described optical recording embodiment is not to be read or construed so as to limit the applicability of the invention to the optical recording art, or to any specific optical recording media, or to any particular physical configuration or formatting of such media. This description is intended to define only one particular embodiment with which the principles of this invention can be readily employed. With the above in mind, the preferred embodiment of the invention will be described with reference to its applicability with optical data storage media of the disk type. Similarly, while the principles of this invention apply to such disks having either grooved or non-grooved surfaces, the preferred embodiment of the invention will be described with reference to a non-grooved optical recording disk. Referring to FIG. 1, such an optical data storage disk is diagrammatically illustrated at 20. Physical features of such disks are well known in the art, and will not be detailed herein except to briefly describe the functional characteristics thereof.

The optical disk 20 may typically be constructed from one or more thin flat circular pieces of glass, plastic or other appropriate underlying substrate base material having a media coating on at least one surface thereof which is programmably responsive to laser light. Such disks may be of any suitable size, as dictated by the read/write equipment with which they are to be used. The disk is configured to be operatively rotated (as shown at 21) about a central axis 24. In a preferred configuration, the disk 20 has a polycarbonate substrate material with an overlying composite media material approximately 0.1 micrometer thick. While a particular type of optical media is described herein, those skilled in the art will readily appreciate that the invention applies to all types of optical media such as the ablative type, bubble-forming type, dye polymer phase change type, magneto-optical crystal, and any other type of media capable of being marked with a "marker" as defined herein. The disk of the preferred embodiment has a composite thickness of approximately 3.0 millimeters and has a diameter of 130.0 millimeters. The media material may be physically protected by an overlying protective coating. Information is stored in the media of the disk by selectively physically altering the properties of the media by an appropriate form of energy. In the preferred embodiment the energy used is derived from a focused laser beam; however it will be understood that many other energy forms could be used as dictated by the type of storage media employed. Such recording of information or data into the optically responsive media is accomplished within the scope of this invention by forming "markers". While the preferred embodiment of the invention will be described with reference to a method and apparatus that "writes" the markers by means of laser or other appropriate energy burst techniques, it will be understood that the principles of this invention also apply to those applications wherein the information to be distributed may first be recorded on a master disk and thereafter replicated onto other disks by, for example, appropriate stamping techniques. The markers may, for example, be in the form of deformations (holes, apertures, depressions, pits, protrusions or the like), phase changes, Faraday effects, changes in reflectivity or any other change that causes information to be recorded in or on the media and provides a readback signal using digital means. Further, the markers are not limited to continuing "binary" information, but may represent multiple levels (i.e. "m-ary", as herein described in more detail) of information. As used herein, the processing of forming any such physical or digitally readable alterations to the media for the purpose of information storage therein (including replicating and stamping techniques) will be broadly referred to as the "writing" of information into the media or for the preferred embodiment, on the disk. Conversely, the process of detecting such written alterations of the disk media will be referred to herein as "reading" of the media, or of the disk.

In the preferred embodiment of the invention, writing of information (markers) on the disk is performed by forming holes in the media (referred to as "pits") by a laser beam. The physical size, when viewed in top plan of a pit depends upon the characteristics of the laser beam forming the pit, upon the physical characteristics and thickness of the recording media material and upon the rotation speed of the disk 20 during the writing operation. In the preferred embodiment, with a laser having a writing power of 8 milliwatts for a 100 nanosecond duration, the typical half power diameter of a pit is approximately 1.0–1.1 microns. It will be understood, however, by those skilled in the art that the marker size, the energy power source used to form a marker and the various other factors relating to marker formation are matters of design choice based upon system, media and design criteria. As will become apparent from a more detailed description of the invention, it is desirable to form the markers as "circular" as possible, in order to best utilize the principles of this invention. The principles of the invention also apply, however with less benefit, to markers of non-circular configuration.

In a preferred embodiment of the invention data pits are sequentially formed in the disk media along either cylindrical or helically formed patterns called "tracks" 22 around a spindle aperture 23 formed in the center of the disk. The configuration in which information is recorded on the disk by means of the pits, is referred to as the "format" or "data format" or "formatting" of the disk. As is well known in the art, formatting of the disk may be performed according to many different arrangements, any one of which would suffice for the purposes of describing this invention. Since the invention is not dependent upon the particular format used, it will be understood that that formatting arrangement hereinafter described with respect to the preferred embodiment of the invention is only representative of one of many possible such arrangements and is not to be construed in a limiting sense. With reference to the embodiment illustrated in FIG. 1, the tracks 22 are circular, concentrically aligned and circumfused about the disk axis 24. As previously stated, however, the track pattern could also be helical or spiral in nature (not illustrated) forming one continuous track spiraling around the disk axis 24. Similarly, while the invention will be described with reference to its use with a disk 20 having a smooth upper surface, the principles of the invention apply equally well to what is referred to in the art as "pregrooved" or "pre-written" disks wherein the tracks are in between or within grooves physically formed within that surface of the disk on which information is to be stored. Further, as previously described, the invention could be applied to non-disk structures such as to drum or plate configurations, or even to crystal configurations wherein the markers are formed and read by means of electron beam energy. In the case of non-disk types of media, such as drum or plate configurations, the tracks could be formed, for example, in row and column configuration.

Referring to FIG. 1, according to one embodiment of disk formatting that can be used to describe this invention, the information recorded on each track 22 is divided into a plurality of "sectors", designated at 25. While there could be any number of such sectors per track, in the preferred embodiment formatting scheme each track 22 is subdivided into 32 equal sectors each defined by an 11.25 degree angle (illustrated at 29) projecting from the center 24 of the disk 20. Each of the sectors within a track contains substantive data and information which is written in a unique format as determined by the particular use to which the disk will be put, that can be interpreted by appropriate computer, error detection or synchronization circuits known in the art. In the preferred embodiment, the disk rotates at a constant speed and is formatted such that the same amount (i.e. "constant angular density") and type of information is stored in each sector 25 of each track 22 of the disk. It will be appreciated upon a more detailed description of the preferred embodiment formatting configuration that other formatting configurations, wherein the information stored within each sector need not be of the same type are possible. For example entire sectors could be formatted so as to contain only synchronization information while others could contain only data. It will be appreciated that the arcuate length of a sector 25a of a track 22a lying closer to the disk center 24 (FIG. 1) will be significantly shorter than the arcuate length of a sector 25b of a track 22b which lies at a greater radial distance from the disk center 24. Therefore, information stored within an outer track sector 25b will be significantly less crowded than that stored within an inner track sector 25a. This property has in the past limited the amount of information that can be stored within a sector and is directly addressed by this invention. It will also be appreciated, that for a disk configuration having a spiral track configuration, in order for the same amount of information to be read or written per unit of time (i.e. to have "constant linear density") that the disk drive speed would either have to vary in relation to the position of the read/write head along the disk or, for a fixed speed drive, that the data rate would have to vary so as to produce markers equally spaced along the track.

Disk drives and circuits that can be used to interpret information (such as error detection, synchronization, etc.) recorded on a track(s) are known or will be readily apparent to those skilled in the art. An example of such circuitry and the design concepts associated therewith, as well as more detailed formatting information as applicable to describing the preferred embodiment formatting technique of this invention are set forth in co-pending U.S. patent application entitled Ram Head Positioning and Tracking System, Ser. No. 06/739,514, filed on May 31, 1985, and assigned to the common assignee of this invention. To the extent that the disclosures and teachings of such related patent application are relevant to the present invention, and are required to more fully describe any circuitry, disk formatting or design principles such as error detection or synchronization theory used herein, they are herein incorporated by reference and form a part of this application as though they were fully set forth in detail herein.

With the use of concentric recording tracks as illustrated in FIG. 1, data crowding on tracks closer to the center of the disk defines the operatively useful data storage region of the disk. Referring to FIG. 1, the disk is typically formatted to include an inner guard band of tracks, generally designated at 26 which define the minimum radius from the center 24 of the disk 20 beyond which usable data recording tracks 22 can exist. The disk also has an outer guard band 27 of tracks located at the outer peripheral edge of the disk 20 which define the outer dimension of usable data recording surface area of the disk 20. The guard bands 26 and 27 each typically comprise 100 to 200 tracks of specific data which is used by a laser reading head to detect positioning overrun of the head during a coarse positioning/selection mode of operation. In a typical disk of the prior art, such as referred to in the referenced co-pending patent application, there are approximately 14,900 usable data recording tracks 22 located between the inner 26 and outer 27 guard bands with the innermost usable track being positioned at a radius of 30.0 mm from the disk center 24, and the outermost usable data recording track being positioned at a radius of 60.0 mm from the disk center 24.

Figure 2:
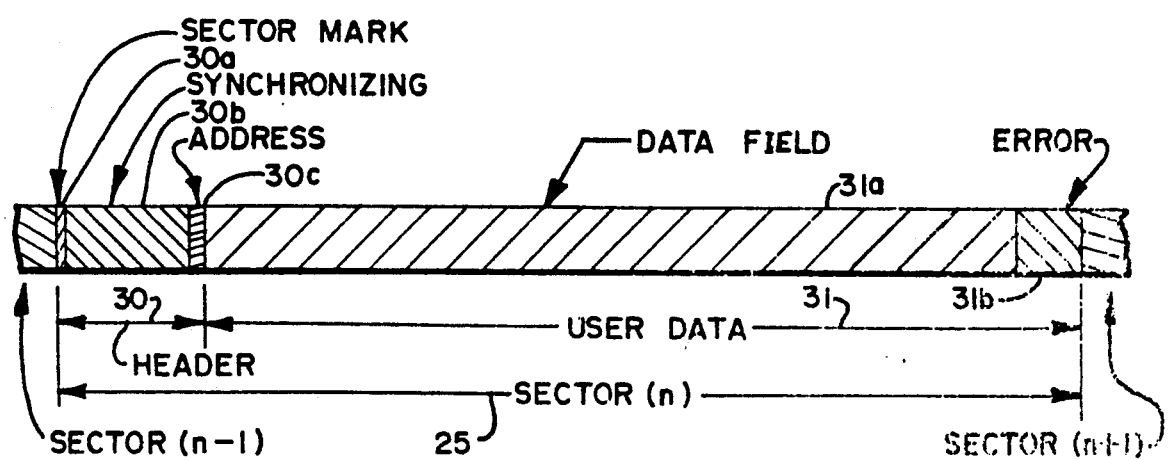
FIG. 2 is a diagrammatic illustration of a typical format of information recorded within a single sector of a data recording track of an information storage disk such as illustrated in FIG. 1.

While the invention applies to virtually any type of formatting scheme, for the purposes of description herein, a typical format such as described in the referenced co-pending patent application will be used. Such format employs a technique wherein each sector 25 contains the same type of information. The format for a single such Sector "n", is generally diagrammatically illustrated in FIG. 2. Referring thereto, each sector generally contains a "header" portion 30 which contains information for system control functions, and a "data" portion 31 which contains the substantive data to be written in the sector. The header 30 portion of a sector may typically include such control information as a "sector mark" 30a, "synchronizing" information 30b, "address" information 30c and servo tracking information (not illustrated). According to such format configuration, as described in some detail in the above-identified cross-referenced patent application, the data stored in the header 30 portion of the sector is typically written into the recording media on either "side" of the center line of a track 22, with each data bit actually comprising a pair of such bits which straddle the track center line so as to provide continuous information to an optical reading head during track crossings, for maintaining the sector data bit count and synchronization function. The user data 31 portion of the sector 25 includes a "data field" 31a, "error" information 31b and servo tracking information (not illustrated). The information stored within the data field 31a portion of the sector is typically written along the center line of the track 22. According to such sector format as described in the co-pending application, servo tracking information is uniformly distributed throughout each sector at 4-byte intervals. Each four bytes of recorded information is followed by one-half byte (i.e. a "nibble") of servo information which provides precise head-track alignment throughout each revolution of the disk 20. As previously pointed out, the particular formatting technique described is not to be construed so as to limit the scope of this invention but only as an example of a format with which the present invention can be employed. For example, while the synchronization information is contained in each of the sectors in the described format, such information could be placed only in selected sectors along a track. Using the above-described format, each track sector 25 has a 360 8-bit byte capacity. The header portion 30 contains 40 bytes, and the user data portion 31 contains 320 bytes. The presence of the servo nibbles and error control information 31b in the user data portion 31 of the sector, reduces the actual number of user available data bytes per sector to 256 bytes. However, the total user available data storage capacity of the entire disk, without the inclusion of the principles of this invention, is typically around 120 million bytes. In the formatting embodiment of the disk illustrated in FIGS. 1 and 2, the header 30 information always occurs at the beginning of a sector as illustrated in FIG. 2. Due to the fact that the synchronizing 30b and servo tracking 30c information recorded in the header portion 30 is very "regular" in appearance, such information can typically be visually "seen" when recorded on the disk in the form of what appear to be radially projecting lines of discoloration in the otherwise uniform surface appearance of the disk media. Such radial header lines are generally illustrated at 28 in FIG. 1.

The spacing between adjacent tracks 22 is determined in part by the diameter of the markers and by the inter-track interference seen by the laser reading head apparatus. The inter-track interference phenomenon and the error signal considerations related thereto are fully discussed in the referenced co-pending patent application Ser. No. 06/739,514, which are incorporated herein by reference. In typical prior art disk geometry configurations using formatting such as described above, a track spacing of about 1.8 micrometers for a marker diameter of 1.1 micrometers is typical. The principles of this invention will allow such inter-track spacing to be significantly reduced.

Figure 3:
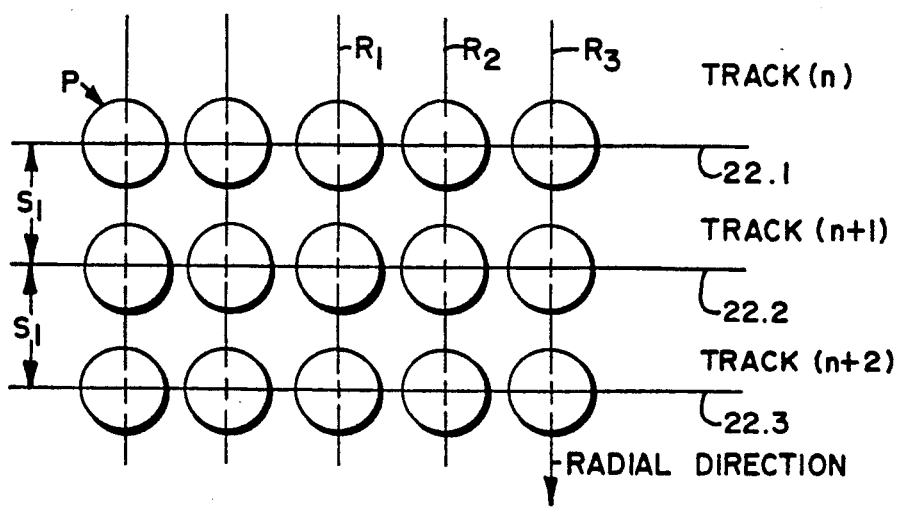
FIG. 3 is a diagrammatic plan view illustration of data storage positions within a data recording track such as illustrated in FIG. 2, as such positions might typically appear in the prior art.

An illustration of the positioning of data recorded in the user data 31 portion of a sector of a track 22, as typically configured in the prior art, is illustrated in FIG. 3. Referring thereto, the marker locations possible for data recording are generally illustrated by the "open circle" locations designated at "P". As will be described in more detail hereinafter, logical information is recorded at such available marker locations "P" by detecting the presence or absence of a marker at such locations depending upon the type of recording modulation used. A logical "one", for example, may be denoted by the presence of a marker at a pit location "P", while a "zero" is indicated by the absence of a marker at a pit location "P". The inter-track spacing is generally designated at $S_1$ and is uniform for adjacent tracks as radially measured on the disk surface, across the entire usable information recording portion of the disk. Referring to FIG. 3, "Track n" is generally designated at 22.1, "Track n+1" is designated at 22.2, and "Track n+2" is designated at 22.3. It should be noted that the possible marker positions "P" need not necessarily contain a recorded marker, but are merely "available" for use as marker positions for recording data on the disk media. The marker positions (P) in FIG. 3 are illustrated as they would typically appear in the in-line geometry configuration of prior art optical disks, and are illustrated in typical spaced relationship to one another for accommodating an acceptable level of inter-track interference. It will be noted that adjacent markers of, for example Track n, identically radially align with corresponding adjacent markers of Track n+1, as illustrated by the radial line positions R1, R2, and R3 in FIG. 3. Such radial in-line geometry of markers along the recording tracks, or the absence of any specific relationship of markers between adjacent tracks in the manner illustrated in FIG. 3 has significantly limited the amount of data that can be recorded on a disk or on other track bearing recording media. The present invention directly addresses this shortcoming of the prior art.

Figure 4:
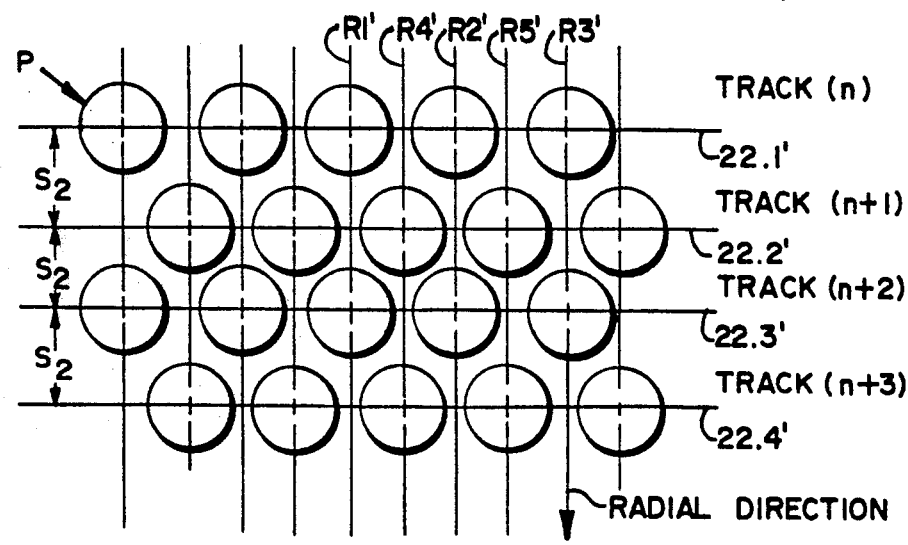
FIG. 4 is a diagrammatic plan view illustration of data storage positions within a track sector portion such as illustrated in FIG. 2, as such positions might appear when configured according to the offset geometry principles of this invention.

A first technique for increasing the storage density of the above-described recording media, according to this invention, is illustrated in FIG. 4. Referring thereto, it will be noted that the available marker positions of adjacent tracks are angularly offset from one another by one-half of the angle between adjacent marker positions, such that they do not radially align with marker positions of adjacent tracks. This feature allows adjacent tracks to be more closely spaced for a given level of inter-track interference, thereby increasing the "packing density" of the marker positions on the recording media surface. It has been found that the offset marker configuration illustrated in FIG. 4 provides the same inter-track interference characteristics between adjacent tracks as does the FIG. 3 marker positioning arrangement; however, the spacing ($S_2$) between adjacent tracks of the offset FIG. 4 geometry is significantly less than the ($S_1$) spacing between adjacent tracks of the FIG. 3 arrangement. It has been estimated with regard to the formatting heretofore used on disks as above described and with a marker diameter of approximately 1.1 micrometers, that solely by the use of the offset marker-location geometry, the worst case adjacent track spacing can be reduced from a prior art minimum of 1.5 micrometers to approximately 1.3 micrometers. It will be appreciated that the worst case marker packing density situation occurs at those track locations positioned adjacent the inner guard band 26. Referring to FIG. 4, it will be noted that while the marker positions of adjacent tracks (such as 22.1' and 22.2') are angularly offset from one another along their respective tracks by an angle of one-half the spacing between adjacent markers, the marker positions of every second track (i.e. 22.1' and 22.3') radially align with one another. For example, the marker positions for tracks 22.1' and 22.3' radially align respectively with one another along the radial lines designated at R1', R2' and R3'; whereas the marker positions for tracks 22.2' and 22.4' respectively radially align with one another along the radial positions designated at $R_4'$ and $R_5'$. This configuration of aligning markers according to an offset geometry generally follows the hexagonal close packing theorem, but wherein markers are sufficiently spaced relative to one another so as to satisfy system inter-track interference specifications.

Figure 5:
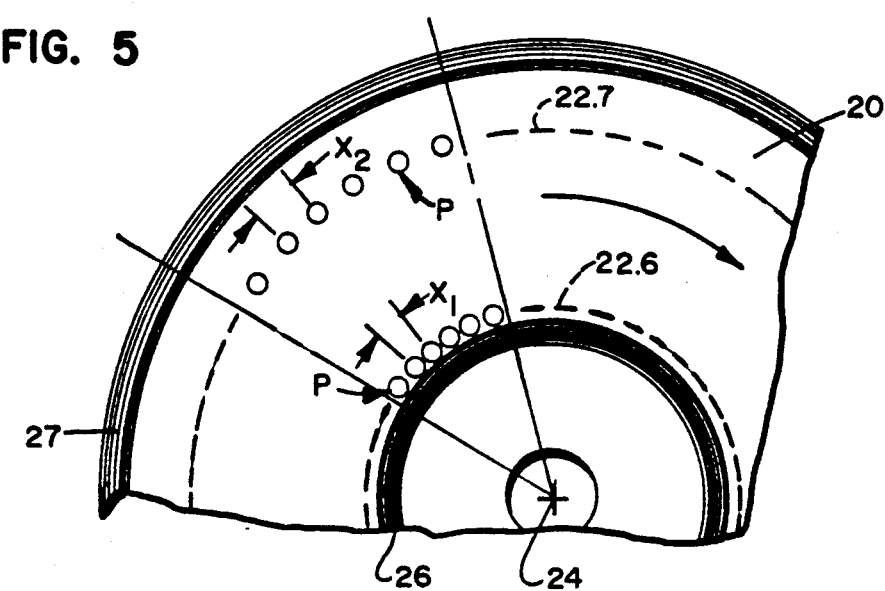
FIG. 5 is a diagrammatic plan view illustrating the comparative spacing between information storage positions along tracks disposed at various radial distances from the center of a uniformly rotating disk.

While providing a first order of increased marker packing density by itself, the offset data positioning configuration for adjacent tracks when applied to information storage disks, allows one to even further increase marker packing density by decreasing the spacing between adjacent tracks as a function of the track radial distance from the center of the disk 20. This result is made possible by the fact that there is more space for data recording within sectors of tracks which are radially spaced further from the center 24 of the disk 20, than there is available in sectors of tracks lying closer to the inner guard band 26 of the disk. This situation is diagrammatically illustrated in FIG. 5. Referring thereto, a sector of a track 22.6 positioned relatively close to the inner guard band 26 of the disk 20 has its respective available data storage positions "P" located fairly close to one another along the track 22.6 thereby providing relatively little spacing between adjacent available data storage positions "P", as illustrated at "x1" in FIG. 5. In contrast, a sector of a track 22.7 located at a greater radial distance from the center 24 of the disk 20 than that of track 22.6 will have significantly more space available to it for recording the same amount of data as was recorded at track position 22.6, and has a significantly larger spacing distance "x2" between adjacent available data storage positions. The additional space (x2-x1) between adjacent data storage positions allows the inter-track spacing to be progressively reduced as one moves radially outward from the center of the disk 20, since there is more room between adjacent data storage positions on such tracks to accommodate (by use of the off-set positioning theory) data marker positions from the adjacent tracks. This situation is better exemplified with reference to FIGS. 6 and 7.

Figure 6A:
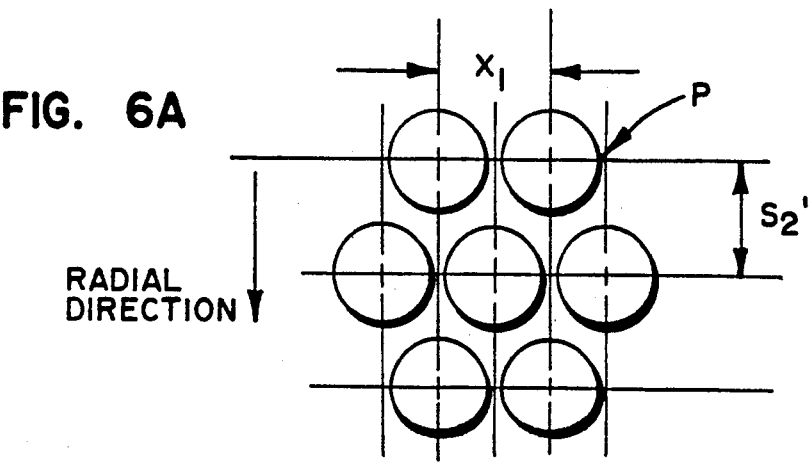
FIG. 6A illustrates the bit positioning as it would appear for a track lying near an inner radius of the data recording portion of a disk.
Figure 6B:
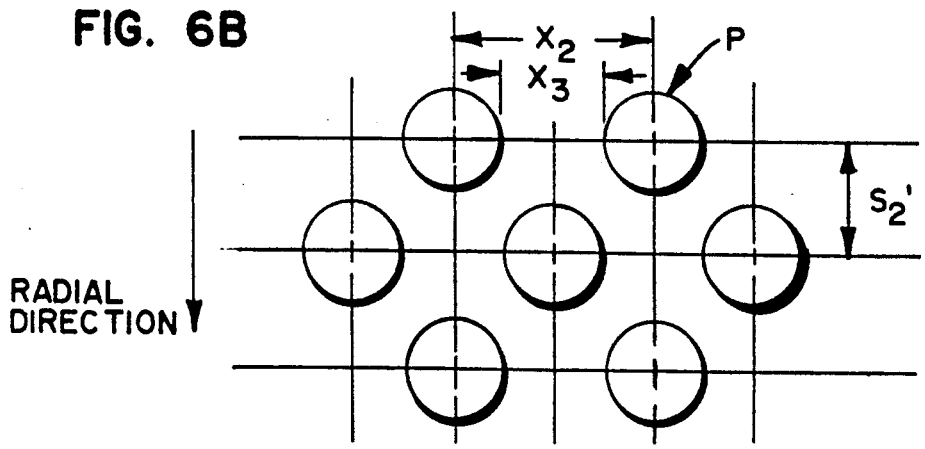
FIG. 6B illustrates the bit positioning as it would appear for a track lying near an outer radius of the data recording portion of a disk.

FIG. 6 represents a somewhat scaled illustration of available data storage marker positions for a disk 20 configured according to the preferred offset marker geometry hereinbefore described for two situations: (1) that of FIG. 6A, which illustrates data storage positions for "inner" tracks located relatively close to the inner guard band 26; and (2) that of FIG. 6B, which illustrates data storage positions for "outer" tracks located relatively closer to the outer guard band 27. For those parameters of the optical disk 20 hereinbefore described, the "x1" spacing between adjacent available data storage positions of the "inner" tracks as illustrated in FIG. 6A, is approximately only one-half of the "x2" spacing between similarly positioned available data storage positions on the "outer" tracks of FIG. 6B. As applied to the physical parameters of the typical disk configuration previously described, FIG. 6A would represent the relative available data storage position spacing where "x1" is approximately 1.1 microns and the adjacent track spacing $S_2'$ is approximately 1.3 microns. FIG. 6B illustrates the relative available data storage position geometries using only the principles of this invention as hereinbefore described, wherein the adjacent track spacing $S_2'$ remains at 1.3 microns, but wherein the "x2" dimension has increased to 2.2 microns, leaving a gap "x3" between adjacent available data storage positions of approximately 1.1 microns. It will be appreciated that such "x3" dimension is large enough to almost entirely accommodate another data storage bit position or marker. Although hereinafter described in more detail, it should be noted that the preferred marking scheme used in association with recording and reading information on or from the disk is a pulsed type of marking scheme referred to as a "return to zero" (RZ) marking scheme. The RZ or other pulsed marking schemes are preferred for forming markers since the markers formed thereby generally have circular domains. This is in contrast to those marking schemes (such as typically used in the magnetic recording art) which use modulation techniques that form markers having elongated or elliptical domains. As will become readily apparent from a more detailed description of the invention, the principles of this invention can be most effectively applied to increasing information storage capacity of information storage media when the information storage markers are circular in shape. Such circular nature of the markers enables the designer to effectively utilize the offset marker geometry and reduced inter-track spacing principles of this invention.

Figure 7:
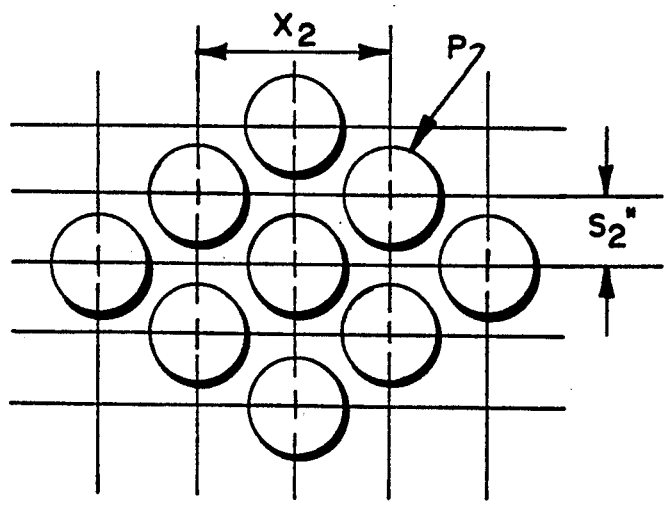
FIG. 7 is a diagram illustrating how the information bit storage positions of FIG. 6B would appear when the variable track spacing principles of this invention are simultaneously applied with the offset geometry alignment principles.

The comparative diagrams of FIGS. 6A and 6B suggest that the inter-track spacing ($S_2'$) can be reduced as some function of the radial distance of the track from the center of the disk. By way of example, if the original inter-track spacing $S_2'$ of FIG. 6 was 1.3 microns, for a marker "P" diameter of approximately 1.0 microns in diameter, FIG. 7 illustrates how the data storage positions of FIG. 6B would appear with a reduced inter-track spacing $S_2'$ of 0.75 microns, with all other parameters remaining the same. FIG. 7 readily illustrates that reduction of the inter-track spacing near the "outer" guard band 27 can provide nearly a two-to-one local increase in marker packing density as compared to that marker packing density possible along a track positioned near the "inner" guard band 26. Research data has indicated that the FIG. 7 arrangement provides more interference from the markers located two tracks removed (i.e. above and below) from the track of interest, than from the adjacent markers on the same track. However, the interference margins for this situation are still better than those recorded for the data storage marker configuration of FIG. 6A, for tracks located near the inner guard band 26.

For prior art disk recording configurations employing uniform inter-track spacing across the disk surface, the radial position of the disk drive read/write laser head on the disk surface could be easily determined by the equation:

$$P = bN$$

wherein "N" is the Track number, "b" is the inter-track spacing, and "P" is the distance from the radially outermost usable track (i.e. Track "0" which is the first usable track adjacent to the outer guard band 27).

In order to practically implement the non-uniform track spacing concept as illustrated in FIG. 7, the above equation must be modified to provide a means for the disk drive read/write head positioning apparatus (not illustrated) to locate any desired track. In the preferred embodiment, a simple polynomial equation in the following form can be used:

$$P = bN + aN^2$$

where: "P" is the radial distance from the outermost usable track, "N" is the Track Number beginning with "zero" at the outermost usable tracks between Track "0" and Track "1", "b" is the track spacing at the outer radius, and "a" is given by the following equation.

$$a = (TS_i^2 - TS_o^2)/(4P_i)$$

where "$TS_o$" is the track spacing at the outermost radius near the outer guard band 27, "$TS_i$" is the track spacing at the innermost radius near the inner guard band 26, and "$P_i$" is the innermost track radius.

The Track Number as a function of "P" is found to be:

$$N = (-b + \sqrt{b^2 + 4aP})/(2a),$$

and the track spacing as a function of "P" is given by:

$$TS(P) = \sqrt{b^2 + 4aP}.$$

Although the above example uses a second order polynomial equation for determining the track location and inter-track spacing as a function of radial position along the disk surface, it will be readily appreciated by those skilled in the art that such equation provides just one example of a possible solution and that higher order polynomial equations could readily be used. The principles of this invention do not even require that an equation in polynomial form be used. Any equation (non-polynomial, logarithmic, etc.) that smoothly varies the inter-track spacing as a function of radial distance from the center of the disk (i.e. which monotonically decreases the inter-track spacing from the innermost to the outermost usable track locations) can be used. Such equations, however, should be distinguished from those that define the concept of "banding" (i.e. wherein inter-track spacing varies with disk radius but in discrete steps or bands). It will be appreciated, that once the equation for determining the track location is defined, those skilled in the art can readily design disk drive apparatus responsive to such equation for properly positioning the read/write head of the system for operative alignment with the proper track of an information recording disk having markers configured thereon according to the principles of this invention.

Figure 8:
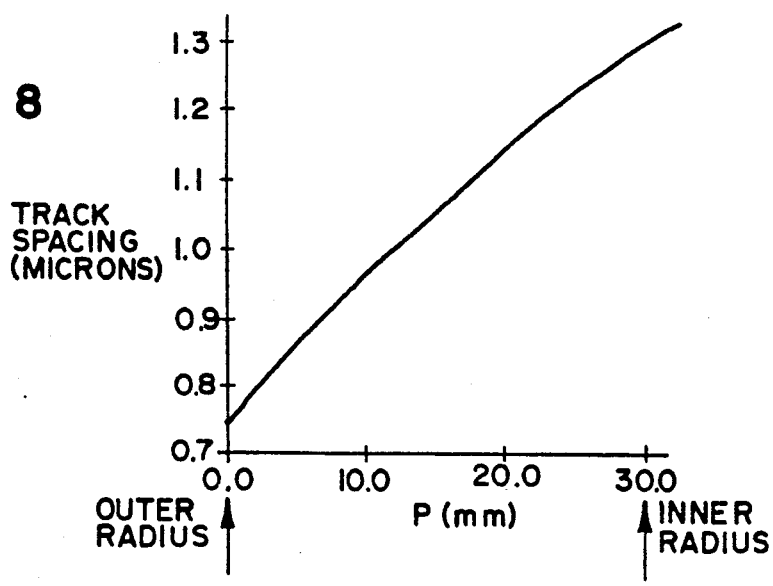
FIG. 8 is a graph illustrating track spacing as a function of radial position of the track from the center of a disk when calculated according to an equation derived from the principles of this invention.

The inter-track spacing chart of FIG. 8 was derived by use of the above-described equations for a typical disk of prior ar configuration having a diameter of 130 mm, a usable track radius of 30 mm as measured between the inner and outer guard bands, and illustrates an example of the marker position packing density that can be achieved on a disk by application of the principles of this invention. Referring to FIG. 8, the following conditions were used: the track spacing at the outermost radius (i.e between Track "0" and Track "1") was 0.75 microns; the track spacing at the innermost radius (i.e. closest to the inner guard band 26) was 1.3 microns; the innermost radius was 30 mm; and the outermost radius (i.e. that of Track "0") was 60 mm. With the above parameters and by use of the above-defined equations, it will be noted from the chart of FIG. 8 that the inter-track spacing smoothly varies from 1.3 microns to 0.75 microns when proceeding from the inner to the outer radius.

From the above, it will be appreciated that a significant increase in available marker position density, and therefore information storage capacity, of a disk can be achieved through the use of the principles of this invention. As an example, for a typical 130 mm diameter disk as previously described, with a 30 mm radial workable surface track area extending between 30 mm and 60 mm from the disk center, and a 1.8 micron inter-track spacing, there are approximately 17,000 available usertracks. Using the format scheme described above wherein each track sector has 256 available user bytes, the prior art disk described had a capacity of approximately 140 megabytes available for user information storage. However, using only the offset marker geometry principles of this invention described with reference to FIGS. 3 and 4, with a reduced inter-track spacing of 1.3 microns, the number of user tracks and information storage capability of the same disk can be increased to 23,000 and approximately 190 megabytes respectivly, nearly a 35 percent increase in capacity. By further incorporating the non-uniform track spacing of this invention as described in the above example for an inner radius track spacing of 0.75 microns and an outer radius track spacing of 1.3 microns, the number of user tracks and information storage capability of the same disk can be further increased to approximately 29,000 and 237 megabytes respectively, approximately another 25 percent increase in storage capability.

Figure 9:
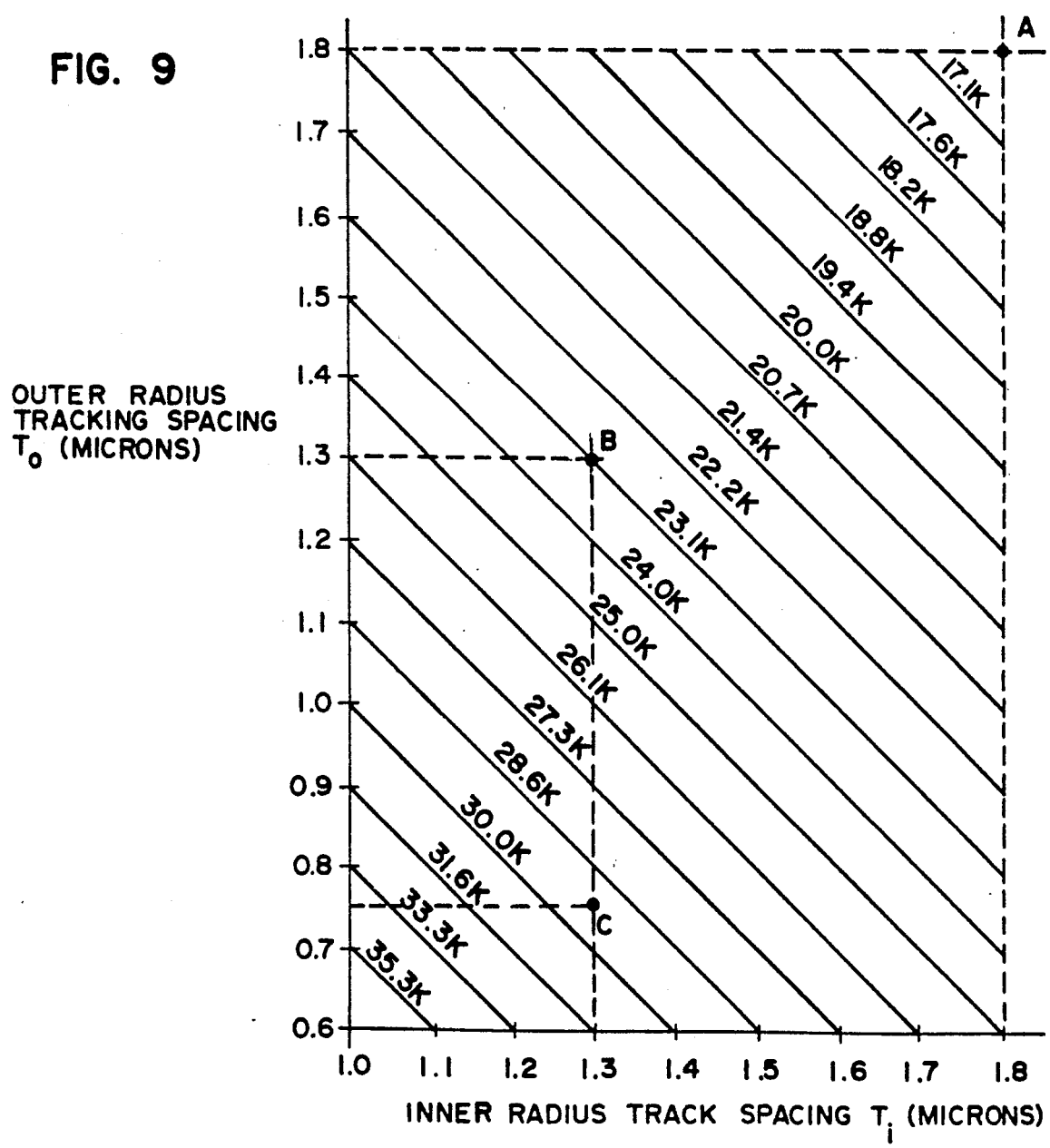
FIG. 9 is a chart illustrating the storage capacity increases that can be obtained for a storage disk by practicing the variable track spacing principles of this invention.

The above-described results are graphically illustrated in FIG. 9 which represents a chart that was developed using the non-uniform inter-track spacing formula developed above, wherein the number of tracks equals:

$$N_T = (2P)/(T_i + T_o)$$

where: "P" is the working track radius available between the inner and outer guard bands, "Ti" is the inter-track spacing at the inner guard band and "To" is the inter-track spacing at the outer guard band. Referring to the chart of FIG. 9: The point designated as "A" depicts the number of tracks available with prior art disk configurations as above described; the point "B" designates the number of tracks available by the use of the offset pit alignment principles of this invention as above described; and the point "C" designates the number of tracks made available by using both the offset geometry positioning and the variable inter-track spacing principles of this invention as above described. Other parameter combinations using different inner and outer track spacing parameters (Ti and To respectively) can be readily derived from the chart of FIG. 9 and will provide numerous design ideas to those skilled in the art.

As discussed in the Background portion of this specification, the development of increasing storage capacity of optical storage disks to date has been hampered by carry over to the optical disk technology of those ideas and design philosophies that have been used and developed specifically for the magnetic storage art. In the design of optical storage media and optical recording apparatus, however, one need not be hampered by those design limitations present in the magnetic recording art design that are not required or applicable to the design of optical recording media. Such recognition opens countless possibilities for significant design enhancement of optical recording structures over those heretofore attainable strictly through magnetic recording art principles. For example, the magnetic recording art often uses a Modified Frequency Modulation (i.e. "MFM") scheme, which can be used but is not required in optical recording. The MFM modulation scheme requires the use of two "cells" for each bit position, and generally contains little DC content in the recorded signal.

For example, to write a logical "1" using the MFM modulation scheme, one cannot simply use a single data recording "cell" for entering a positive (or alternatively negative) pulse, but must use two "cells" to describe the logical "1". Further, the actual recorded format for the logical "1" that will be entered into the two cells of the magnetic recording media, depends upon whether the logical "1" to be entered is preceeded in its data stream by another logical "1" or by a logical "0". In the former case, the actual entry into the two magnetic media cells used for a logical "1" will be (1,0). For the latter case, the logical "1" entry will be (0,0). Recorded signals using MFM modulation contain little DC content, which is compatible with magnetic sensing heads (typically transformer type sensors) which cannot support a DC content.

In contrast to the burdensome MFM type modulation scheme typically used in the magnetic recording art, the optical recording scheme "is" DC competent, which provides a basis for the use of modulation schemes for optical recording other than MFM and other related modulation schemes. By its very nature, the optical recording scheme is sensitive to all particular data patterns such as all "zeros" or all "ones", when serially recorded next to each other. Such serial recording can be performed by the use of a single cell position for a single logical entry (such as a logical "1") as contrasted to the two-cell limitation of the MFM modulation scheme. In addition, with optical recording techniques clocking information can be directly derived from the servo nibbles (described in detail in the cross-referenced co-pending patent application Ser. No. 06/739,514) removing the necessity for using self clocking modulation schemes, such as MFM or 2-out-of-7 that are commonly used with magnetic drive schemes.

These features of optical recording allow one to consider modulation formats that are not self-clocking and which require DC competence, and which allow for significantly higher data storage densities on a given optical recording media. Two such modulation schemes that can be used to replace prior art MFM modulation schemes are the NRZ (Non-Return to Zero) code and the RZ (Return to Zero or pulsed NRZ) code. The RZ modulation scheme is presently considered the more desirable choice since it is compatible with "writing with pulses" modes of operation that results in essentially circular markers and provides the benefit that information written by the RZ format is logically ORed on the media. This allows some fields (such as flags and pointers) to be written after the initial data recording.

These features would allow for flagging of sectors that fail after disk certification, and potentially allow for minor updates of files without rewriting the entire file. These features are in direct contrast with the "write-once" nature of the MFM code. As previously pointed out, the offset geometry alignment principles of this invention are most effectively practiced when the information storage markers are round or circular in configuration. While the preferred embodiment of the invention is illustrated with markers that are spaced from and do not touch one another, it will be appreciated by those skilled in the art that the principles of this invention can also be employed in situations wherein the markers slightly overlap one another.

Figure 10:
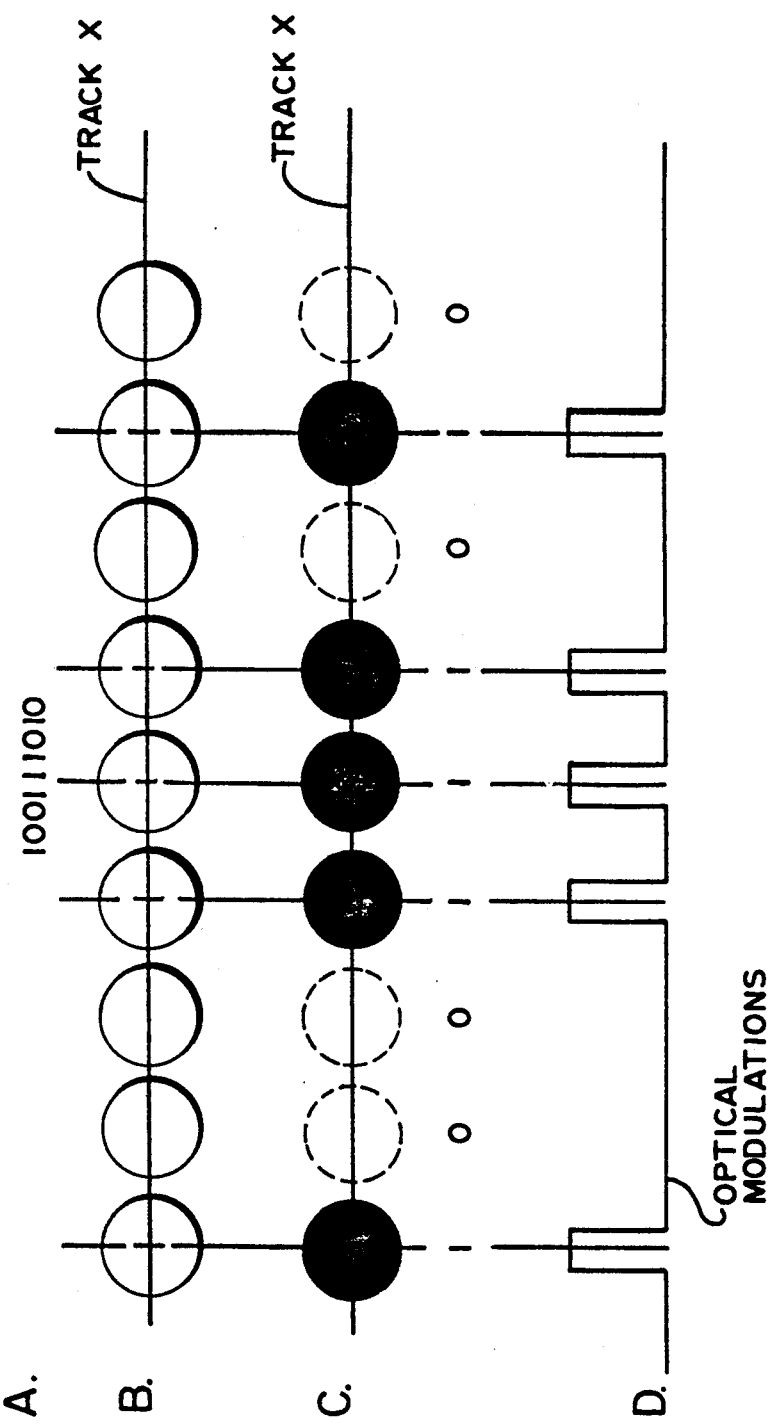
FIG. 10 is a diagrammatic illustration of a pulsed RZ marking scheme for encoding data into the data storage positions of a segment of a typical track of an information recording media.

The RZ modulation scheme basically provides for writing a logical "one" in a single cell position by, for example, burning a pit or marker in a designated marker position and for recording a logical "0" by simply leaving a designated marker position unaltered. An example of the use of a pulsed RZ marking scheme for encoding data into the data storage positions of a typical track of an optical recording media is illustrated in FIG. 10. Referring thereto, FIG. 10A depicts the logical (i.e. binary) number to be recorded as: 100111010. FIG. 10B illustrates the data recording (marker) positions along Track "X" that are available for recording. FIG. 10C illustrates Track "X" as it would appear after recording of the "100111010" logical information into the available data recording track positions. It should be noted that the recording of data on Track "X" proceeds from "left to right" as illustrated in FIG. 10. Those "empty" data positions into which a pit was not burned, are diagrammatically illustrated in dashed lines in FIG. 10C. FIG. 10D illustrates the intensity of the modulated laser beam required to write the pattern of FIG. 10C and illustrates the "return to zero" nature of the modulation.

While the preferred embodiment of the invention has been described with reference to a "binary" type of information storage scheme (i.e. wherein the presence or absence of a marker at a designated data storage position represents a logical "1" or "0"), it will be understood that the invention is not limited to binary recording principles. The principles of this invention apply equally well to "m-ary" modulation schemes wherein, for example in magneto-optic recording, the media is capable of storing "m" different levels or states of logical information at a single information storage marker position.

It will be apparent to those skilled in the art, that from the foregoing description of the applicability of RZ modulation to optical media data storage, that the data storage density in the recording media can be immediately doubled over that capacity heretofore possible by the use of MFM modulation techniques having orthogonal cells. This results directly from the fact that with RZ modulation only a single cell is needed to record a logical "bit" of information, as opposed to the two cells that are required to record each "bit" of logical information with the MFM modulation scheme. This feature, coupled with the offset alignment and graduated inter-track spacing as a function of radial distance from the center of the disk, enable significantly increased packing density of recorded information on a given optical storage media. M-ary modulation schemes offer yet further increases in information storage capabilities, but are, as previously described, most applicable when the markers are generally circular.

While the present invention has been described with respect to its application as illustrated in the preferred embodiment, it will be understood that a number of variations of the embodiment and its applications for use with varied optical and magnetic data storage media are possible. Such modifications of the invention will become apparent to those skilled in the art, in light of the foregoing description. This description is intended to provide specific examples of embodiments which clearly distinguish and disclose the present invention. Accordingly, the invention is not limited to the described embodiments, or to the use of specific components, materials, modulation schemes or parameter dimensions described herein. All alternative modifications and variations of the present invention which fall within the broad scope of the appended claims are covered.

What is claimed is:

1. A method of writing information in a digital recording storage media having a recording surface area, said media being suitable for recording discrete markers of data information in response to energy bursts from a writing device, said markers having an effective diameter parameter as measured relative to said surface area, said method comprising:
    (a) forming a first track segment of digital information in said storage media comprising a plurality of said markers aligned and spaced along a first track;
    (b) forming a second track segment of digital information in said storage media comprising a plurality of said markers aligned and spaced along a second track, said second track segment being disposed generally parallel to and adjacent said first track segment, said first and said second track segments being spaced along their respective lengths by a distance less than or equal to twice the largest effective diameter of said markers; adjacent said markers of said first and said second track segments respectively being offset from one another and being characterized by a given level of cross-talk interference therebetween;
    (c) forming additional tracks and track segments of digital information in said storage media in the manner used for forming said first and said second track segments, wherein the markers of said additional track segments are respectively offset from markers of adjacent track segments; and
    (d) varying the spacing between adjacent tracks across said storage media surface area to maintain the total interference between adjacent markers across said media generally constant.

2. The method as recited in claim 1, wherein said tracks of said first and said second track segments are spaced by a distance of less than or equal to one and one-half times the largest effective diameter of said markers.

3. The method as recited in claim 2, wherein said largest effective diameter parameter of said markers is less than or equal to 1.5 micrometers.

4. The method as recited in claim 3, wherein said largest effective diameter parameter of said markers is less than or equal to 1.0 micrometers.

5. The method as recited in claim 1, wherein said largest effective diameter parameter of said markers is less than or equal to 1.5 micrometers.

6. The method as recited in claim 5, wherein said largest effective diameter parameter of said markers is less than or equal to 1.0 micrometers.

7. The method as recited in claim 1, wherein said marker is characterized by a generally circular shape as measured relative to said recording surface area.

8. The method as recited in claim 1, wherein said storage media is of a type suitable for recording m different states of digital information within a marker such that each marker is capable of containing m levels of digital information 9. The method as recited in claim 1, wherein said recording surface area forms part of a curvilinear surface of an information recording drum apparatus.

10. The method as recited in claim 1, wherein said recording surface area is generally planar.

11. The method as recited in claim 10, wherein said recording surface area forms part of an information recording plate apparatus.

12. The method as recited in claim 1, wherein said recording surface area has a plurality of grooves formed therein; and wherein said track segments align with said grooves, with said markers thereof being located by said grooves.

13. The method as recited in claim 1, wherein the markers of said second track segment are offset with respect to corresponding markers of said first track segment by a distance as measured along said second track segment of approximately 50% of the separation distance between centers of adjacent markers along said first track segment.

14. The method as recited in claim 1, wherein said digital recording storage media comprises a recording surface area of a recording disk apparatus; wherein said first and said second track segments are part of the same track along which said digital information is recorded in said media, said track being spirally configured on said surface about a central axis of said disk.

15. The method as recited in claim 1, wherein said digital recording storage media comprises a recording surface area of a recording disk apparatus; wherein said first and said second track segments respectively comprise segments of distinct first and second tracks along which said digital information is recorded in said media, said first and said second tracks being concentrically aligned on said surface about a central axis of said disk.

16. The method as recited in claim 15, further characterized by the markers of alternating tracks being radially aligned with one another about said disk axis and markers of adjacent tracks being angularly offset with respect to one another.

17. The method as recited in claim 15, wherein the radial spacing between adjacent tracks is non-uniform across said recording surface area.

18. The method as recited in claim 15, wherein the inter-track spacing smoothly decreases monotonically as a function of the increase in radial distance from the disk central axis.

19. The method as recited in claim 15, wherein the radial positions of said tracks from the central axis of said disk are located according to a polynomial function.

20. The method as recited in claim 19, wherein the radial positions of said tracks from the central axis of said disk are located according to a second order polynomial equation.

21. The method as recited in claim 15, wherein the tracks of said disk are segmented into sectors defined by rays projecting radially outward from the center of said disk; wherein track segments within one of said sectors are configured to contain the same number of markers; whereby the digital information is stored on said tracks according to a constant angular density.

22. The method as recited in claim 1, wherein said digital recording storage media is an optical storage media, and wherein said digital information formed on said first and said second track segments comprises optically readable information.

23. The method as recited in claim 14, wherein said digital recording storage media is an optical storage media, and wherein said digital information formed on said first and said second track segments comprises optically readable information.

24. The method as recited in claim 15, wherein said digital recording storage media is an optical storage media, and wherein said digital information formed on said first and said second track segments comprises optically readable information.

25. The method as recited in claim 17, wherein said digital recording storage media is an optical storage media, and wherein said digital information formed on said first and said second track segments comprises optically readable information.

26. The method as recited in claim 18, wherein said digital recording storage media is an optical storage media, and wherein said digital information formed on said first and said second track segments comprises optically readable information.

27. The method as recited in claim 1, wherein said markers are written according to a pulsed return to zero marking scheme.

28. The method as recited in claim 21, wherein said markers are written according to a pulsed return to zero marking scheme.

29. A method of configuring data information stored in optical or magnetically responsive storage media of a recording disk of the type wherein the information is stored by means of markers aligned along one or more tracks having generally parallel adjacent track segments disposed about the center of the disk, comprising the steps of:
 (a) forming a plurality of spaced markers along each of a plurality of radially spaced adjacent track segments in a manner wherein markers of adjacent said track segments are angularly offset relative to one another as viewed from the center of the disk, wherein said adjacent track segments are radially spaced from one another by a distance of less than or equal to twice the effective diameter of said markers as measured in the radial direction; and
 (b) varying the radial spacing between adjacent track segments across the storage media such that the total interference between adjacent markers is generally constant across said media; whereby marker packing density of said storage media is increased.

30. The method as recited in claim 29, wherein the inter-track spacing between adjacent ones of said track segments decreases as a function of the radial distances of such tracks from the center of the disk.

31. The method as recited in claim 29, wherein said markers are written according to a pulsed return to zero marking scheme.

32. The method as recited in claim 30, wherein said markers are written according to a pulsed return to zero marking scheme.

33. A method of maximizing data information storage in an optically readable information storage media of a recording disk of the type wherein the information is stored by means of markers characterized by generally circular shape and aligned along a plurality of tracks having generally parallel adjacent track segments disposed about the center of the disk, comprising:
- (a) defining a plurality of tracks of optically readable information on said disk, each of said tracks being characterized by a plurality of spaced markers formed generally along a circle having its center at the axis of the disk; adjacent said tracks being radially spaced by a distance less than or equal to twice the average diameter dimension of said markers in the radial direction;
- (b) arranging said markers along their respective tracks such that markers of adjacent tracks are angularly offset relative to those of the adjacent tracks; and
- (c) progressively decreasing the inter-track spacing with increased radial distance of the tracks from the disk center, thereby maintaining total interference between adjacent markers relatively constant across the disk storage media.

34. The method as recited in claim 33, wherein said markers are written according to a pulsed return to zero marking scheme.

35. The method as recited in claim 33, wherein said markers are generally configured with respect to one another in successive adjacent tracks according to a hexagonal close packing pattern.

36. A digital recording storage device, comprising:
- (a) a recording storage media means operatively responsive to energy bursts from a writing device for recording discrete markers of digital data information, said storage media means defining a recording surface area;
- (b) said storage media means being characterized by a plurality of said markers therein arranged and configured relative to said recording surface to define a plurality of spaced marker tracks lying generally parallel to one another, with markers of adjacent said tracks being offset relative to one another and being characterized by a level of total interference therebetween; and
- (c) said tracks being characterized by varied spacing between adjacent tracks across said surface area such that said total interference between markers remains relatively constant across said surface area.

37. A digital recording storage device according to claim 36, wherein said markers are characterized by an effective diameter parameter, and wherein adjacent ones of said tracks are spaced along their respective lengths by a distance less than or equal to twice the largest effective diameter of said markers.

38. A digital recording storage device according to claim 37, wherein said tracks are spaced by a distance of less than or equal to one and one-half times the largest effective diameter of said markers.

39. A digital recording storage device according to claim 38, wherein said largest effective diameter parameter of said markers is less than or equal to 1.5 micrometers.

40. A digital recording storage device according to claim 36, wherein said marker is characterized by a generally circular shape as measured relative to said recording surface area.

41. A digital recording storage device according to claim 36, wherein said storage media means is of a type suitable for recording m difference states of digital information within a marker such that each marker is capable of containing m levels of digital information.

42. A digital recording storage device according to claim 36, wherein said recording surface area forms part of a curvilinear surface of an information recording drum apparatus.

43. A digital recording storage device according to claim 36, wherein said recording surface area is generally planar.

44. A digital recording storage device according to claim 36, wherein said recording surface area has a plurality of grooves formed therein; and wherein said tracks align with said grooves, with said markers thereof being located by said grooves.

45. A digital recording storage device according to claim 36, wherein the markers of a first of adjacent tracks are offset with respect to corresponding markers of a second of adjacent tracks by a distance as measured along said second adjacent track of approximately 50% of the separation distance between centers of adjacent markers along said second adjacent track.

46. A digital recording storage device according to claim 36, wherein said recording surface area is disk-shaped and wherein said tracks are concentrically aligned on said surface area about a central axis of said disk.

47. A digital recording storage device according to claim 46, wherein the spacing between adjacent tracks smoothly decreases monotonically as a function of the increase in radial distance from the disk central axis.

48. A digital recording storage device according to claim 36, wherein said recording storage media is an optical storage media, and wherein said digital information formed on said tracks comprises optically readable information.

49. A digital recording storage device according to claim 36, wherein said markers are written according to a pulsed return to zero marking scheme.

50. An information storage apparatus, comprising:
- (a) an information storage media of a type suitable for selectively accepting digital data information in the form of markers;
- (b) means for supporting said information storage media so as to define a recording surface area of said media;
- (c) said media recording surface having a plurality of generally parallel formatted tracks defined thereon, each said track being characterized by a plurality of information storage locations aligned and spaced therealong, each such information storage location being suitable for receiving a marker characterized by an area having a width dimension as measured in said recording surface in a direction generally perpendicular to said tracks;
- (d) adjacent said tracks being spaced from one another by a distance less than or equal to twice said marker width dimension; and
- (e) wherein information storage locations of adjacent tracks are configured in interdigitated manner such that markers of adjacent tracks are offset relative to one another; and wherein the inter-track spacing varies across said media recording surface area such that total interference between markers remains relatively constant across said recording surface area.

51. An information storage apparatus as recited in claim 50, wherein said information storage media is of a type suitable for recording said markers having optically readable properties.

52. An information storage apparatus as recited in claim 51, wherein said support means comprises a disk and wherein said recording surface represents a generally planar surface of said disk.

53. An information storage apparatus as recited in claim 52, wherein the radial spacing between adjacent tracks is non-uniform across the recording surface area.

54. An information storage apparatus as recited in claim 53, wherein the inter-track spacing between adjacent tracks smoothly decreases monotonically as a function of the increase in radial distance of said tracks from the disk central axis.

55. An optically readable information storage disk, comprising:
(a) a disk substrate having a central axis and defining a broad recording surface area around said central axis;
(b) optically readable information storage media means on said disk and addressing said recording surface area for receiving markers containing optically readable digital information;
(c) said recording surface area having a plurality of said markers, each having a generally circular shape relative to said recording surface area and suitable for recording optically readable digital information;
(d) said markers being aligned along and defining a plurality of generally circular tracks having track segments disposed about said central disk axis, adjacent track segments of adjacent tracks being generally parallel and radially spaced by a distance less than or equal to twice the average diameter dimension of said markers as measured in the radial direction, said markers of adjacent track segments being angularly offset relative to one another; and
(e) wherein the inter-track spacing between adjacent tracks progressively decreases with increased radial distance of the tracks from said disk axis, such that total interference between markers is relatively constant across said recording surface area.

56. A digital recording storage apparatus as recited in claim 55, wherein said markers are characterized by a pulsed return to zero format.

57. A digital recording storage apparatus as recited in claim 55, wherein said markers are generally configured with respect to one another in successive adjacent said tracks according to a hexagonal close-packed pattern.

* * * * *